US012612001B2

(12) United States Patent
Mankame et al.

(10) Patent No.: US 12,612,001 B2
(45) Date of Patent: Apr. 28, 2026

(54) CUSTOMER-CENTRIC PORTABLE PERSONAL SEAT COMFORT PREFERENCES

(71) Applicant: GM Global Technology Operations LLC, Detroit, MI (US)

(72) Inventors: Nilesh D. Mankame, Ann Arbor, MI (US); Babak Makkinejad, Troy, MI (US); Paul E. Krajewski, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 295 days.

(21) Appl. No.: 18/342,148

(22) Filed: Jun. 27, 2023

(65) Prior Publication Data

US 2025/0001959 A1    Jan. 2, 2025

(51) Int. Cl.
B60R 16/037        (2006.01)
B60N 2/02        (2006.01)

(52) U.S. Cl.
CPC .......... B60R 16/037 (2013.01); B60N 2/0277 (2023.08)

(58) Field of Classification Search
CPC .. B60R 16/037; B60N 2/0277; B60N 2/0025; B60N 2/003; B60N 2/0268; B60N 2210/40; B60N 2220/10; B60N 2220/20; B60N 2230/20; B60N 2230/30; B60N 2/0248; B60N 2/0273; B60N 2/0244
See application file for complete search history.

(56) References Cited

U.S. PATENT DOCUMENTS

| | | | |
|---|---|---|---|
| 10,245,976 B2 * | 4/2019 | Hotary ................. | B60N 2/0235 |
| 2018/0199729 A1 * | 7/2018 | Bullard ............. | A61G 7/05707 |
| 2023/0131946 A1 * | 4/2023 | Zagorski .............. | B60N 2/0025 |
| | | | 702/41 |
| 2023/0249599 A1 * | 8/2023 | Nicola ..................... | B60N 2/56 |
| | | | 297/284.6 |

* cited by examiner

Primary Examiner — Peter D Nolan
Assistant Examiner — Demetra R Smith-Stewart
(74) Attorney, Agent, or Firm — Vivacqua Crane, PLLC

(57) ABSTRACT

A method to operate a customer-centric portable personal vehicle seat position system includes: generating pressure sensor profiles in response to a user seated on a vehicle seat of a first vehicle having a seat base and a seat back; correlating the pressure sensor profiles to individual user tasks; performing data reduction of the pressure sensor profiles after correlation to the individual user tasks; and encoding. multiple seat comfort preference profiles.

15 Claims, 5 Drawing Sheets

$$\phi *(t) = a_0 + \sum_{k=1}^{\infty} A_k \cos(kt - \alpha_k)$$

CUSTOMER-CENTRIC PORTABLE PERSONAL SEAT COMFORT PREFERENCES

INTRODUCTION

The present disclosure relates to vehicle seat comfort setting systems.

Existing vehicle seats allow an occupant or user to move a seat base and a seat back to a preferred seat position and to save the preferred seat position for use by one or more vehicle users when a later vehicle operation occurs by pushing a predefined button, key fob or digital switch. The preferred seat position is generally limited to fixing a seat base pitch and front-to-back position, and fixing a seat back angle, with some vehicles also controlling a lumbar support. During the later vehicle operation the user may recall the preferred seat position by pushing the predefined button, key fob or digital switch.

Present vehicle seat position preferences are therefore manually selected and are only retained in the specific vehicle the user originally set the seat position preferences to. If the user purchases or changes to a second or other vehicle, the seat position preferences must be reset, and may not exactly match the original seat position for user position or comfort. In addition, present seat position preferences do not modify the seat during operation of the vehicle, for example to accommodate user comfort changes during long duration driving operation.

Thus, while current systems and methods to select and save a vehicle user preferred seat position achieve their intended purpose, there is a need for a new and improved system and method to select and save a user selected vehicle seat position from one vehicle to another.

SUMMARY

According to several aspects, a method to operate a customer-centric portable personal vehicle seat position system includes: generating pressure sensor profiles in response to a user seated on a vehicle seat of a first vehicle having a seat base and a seat back; correlating the pressure sensor profiles to individual user tasks; performing data reduction of the pressure sensor profiles after correlation to the individual user tasks; and encoding. multiple seat comfort preference profiles.

In another aspect of the present disclosure, the method further includes: positioning a first set of pressure sensors in the seat base generating a first set of the pressure sensor profiles; and locating a second set of pressure sensors in the seat back generating a second set of the pressure sensor profiles.

In another aspect of the present disclosure, the method further includes configuring the first set of pressure sensors in a first array in the seat base to collectively generate the first set of the pressure sensor profiles.

In another aspect of the present disclosure, the method further includes configuring the second set of pressure sensors in a second array in the seat back to collectively generate the second set of the pressure sensor profiles.

In another aspect of the present disclosure, the method further includes: receiving and saving the first set of the pressure sensor profiles, the second set of the pressure sensor profiles and the multiple seat comfort preferences in a module; and forwarding the multiple seat comfort preferences from the module to the user upon request from the user during a second or later vehicle operation.

In another aspect of the present disclosure, the method further includes: generating an output signal using a signal combiner combing the first set of the pressure sensor profiles from the first pressure sensor and the second set of the pressure sensor profiles from the second pressure sensor and; forwarding the output signal to a signal analyzer; generating seat pressure profiles from the first set of the pressure sensor profiles and from the second set of the pressure sensor profiles; and performing signal encoding using the seat pressure profiles to generate a set of Fourier Shape Descriptors (FSDs).

In another aspect of the present disclosure, the method further includes: storing the multiple seat comfort preferences in a customer profile database; recalling the multiple seat comfort preferences from the customer profile database; and adjusting a second vehicle seat of a second vehicle applying one of the multiple seat comfort preferences.

In another aspect of the present disclosure the method further includes: encoding the multiple seat comfort preference profiles for one of a short duration driving event and for a long duration driving event; and selectively requesting one of the multiple seat comfort preference profiles for the short duration driving event or for the long duration driving event.

In another aspect of the present disclosure, the method further includes: encoding the multiple seat comfort preference profiles as a first set of driving tasks when the user defines a vehicle operator and as a second set of non-driving tasks when the user defines a vehicle passenger.

In another aspect of the present disclosure, the method further includes: operating a user interface to allow the user to at least one of visualize, record and manipulate the multiple seat comfort preference profiles.

According to several aspects, a method to generate and use a customer-centric portable personal vehicle seat comfort preference profile comprises: measuring first pressure distributions of a user in contact with a first vehicle seat; computing pressure profiles for a seat cushion and a seat back of the first vehicle seat; creating a compact representation of the pressure profiles having a finite set of Fourier Shape Descriptors (FSDs) in a reduction model; and encoding the finite set as a comfort preference profile of the user for a first vehicle and storing the comfort preference profile in a user profile database located in one of the first vehicle or in a cloud retention system.

In another aspect of the present disclosure, the method further includes informing changing a configuration of the first vehicle seat during a drive to compare a modified pressure distribution to stored values encoded in the comfort preference profile; and switching the configuration of the first vehicle seat as a duration of the drive changes between a short duration operation, a medium duration operation and a long duration operation.

In another aspect of the present disclosure, the method further includes informing automatic changes in the comfort preference profile of the user during the short duration operation, the medium duration operation and the long duration operation.

In another aspect of the present disclosure, the method further includes: automatically conducting dynamic interpolation between values of the comfort preference profile.

In another aspect of the present disclosure, the method further includes: measuring second pressure distributions for the user sitting in a second vehicle seat of a second vehicle; applying the reduction model to generate a compact representation of the second pressure distributions; and comparing the first pressure distributions to the second pressure distributions and applying differences between the first pressure distributions and the second pressure distributions to guide adjustment of the second vehicle seat.

In another aspect of the present disclosure, the method further includes: loading a customer profile having multiple different ones of the comfort preference profile of the user into a user interface to visualize, record and manipulate the customer profile.

In another aspect of the present disclosure, the method further includes selecting the user interface from one of a smart phone, a tablet, a webpage, a key-fob and a computer.

According to several aspects, a method to position personal vehicle seat position system, comprising: recording pressure profiles generated between a vehicle seat and a user of a first vehicle; correlating the pressure sensor profiles to individual user tasks performed by the user during operation of the first vehicle; performing data reduction of the pressure sensor profiles after correlation to the individual user tasks to create a finite set of scalars applied to encode multiple seat comfort preference profiles of the user; storing the multiple seat comfort preference profiles in a customer profile database; and retrieving the pressure sensor profiles of the user during operation of the first vehicle; and changing a configuration of the vehicle seat to obtain a different one of the seat comfort preference profiles as a duration of a vehicle operation changes.

In another aspect of the present disclosure, the method further includes: recalling the customer profile database; and forwarding the customer profile database to a second vehicle.

In another aspect of the present disclosure, the method further includes: applying one of the seat comfort preference profiles to guide an adjustment of a second seat in the second vehicle.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
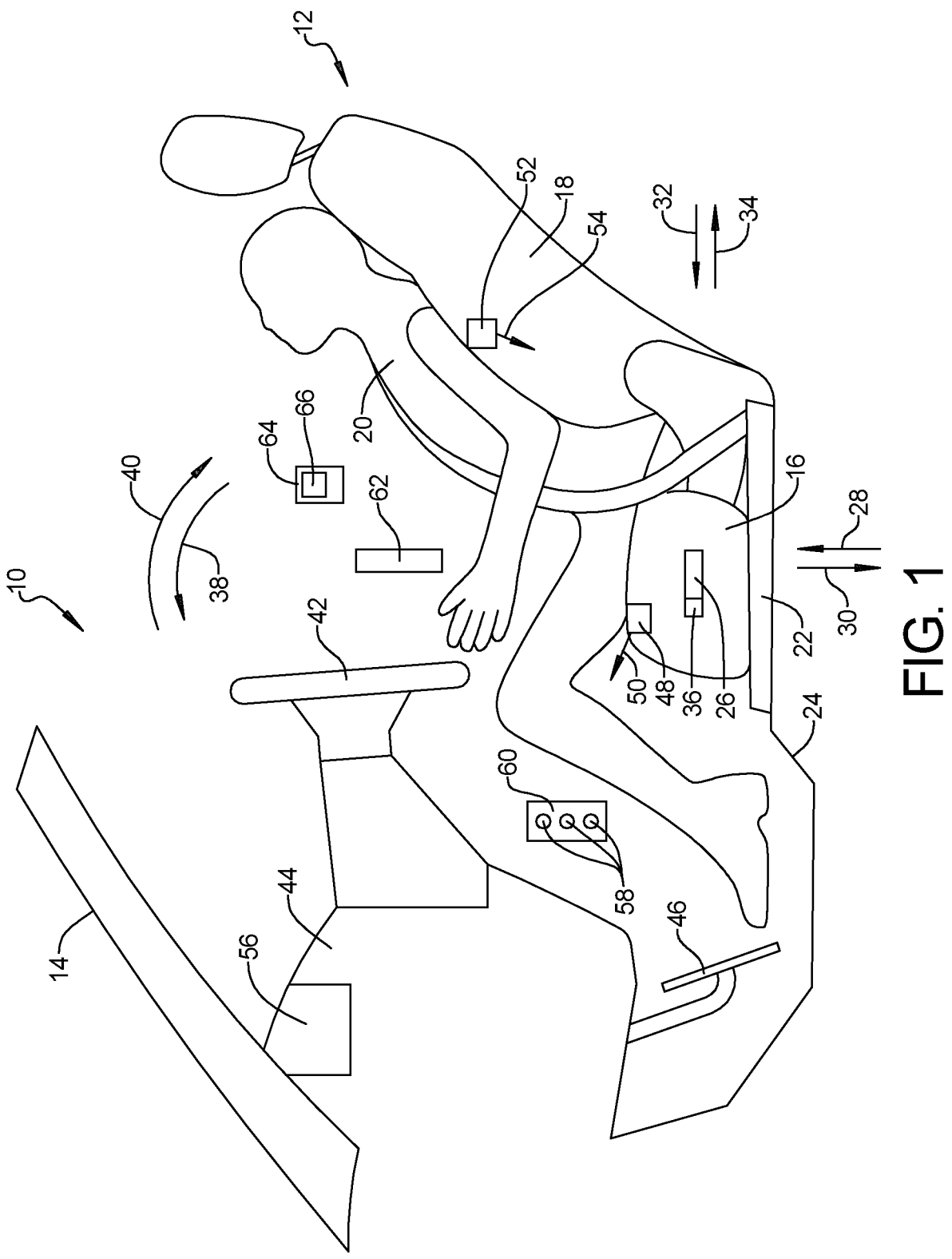
FIG. 1 is a side elevational view of a vehicle seat having a seat positioning system that is suitable for use with a customer-centric portable comfort preference profile according to an exemplary aspect.

Referring to FIG. 1, a customer-centric portable seat comfort preference profile system 10 includes a vehicle seat 12 provided in a first vehicle 14 with the vehicle seat 12 being suitable for use with the customer-centric portable seat comfort preference profile system 10. Customer-centric as used herein is defined as being derived from the needs, expectations or wants of a particular customer. The seat 12 may include a seat base 16 and a seat back 18 which rotates with respect to the seat base 16. According to several aspects the first vehicle 14 may include one or multiple ones of the seat 12. An exemplary user 20 defining an operator, customer or passenger of the vehicle 14 is presented in a seated position on the seat 12. The user 20 may elect to change positions of the seat base 16 and the seat back 18. To accomplish seat position changes, the seat 12 is slidably supported on a rail frame 22 which is fixed to a vehicle structural frame 24. To adjust a position of the seat base 16, a first seat position switch 26 is actuated by the user 20 to slidably displace the seat base 16 in an upward direction 28, an opposed downward direction 30, a forward direction 32 and an opposed rearward direction 34. To adjust a position of the seat back 18, a second seat position switch 36 allows the user 20 to rotate the seat back 18 in a forward arc of rotation 38 and an opposed rearward arc of rotation 40. The user 20 adjusts positions of the seat base 16 and the seat back 18 to initially establish at least one user preferred position which is assigned with a user task, for example a driving task or activity, allowing the user 20 to comfortably reach a steering wheel 42 mounted on a dashboard 44 and a set of pedals 46 when the user task is being performed.

It has been identified that a perception of comfort of seated users correlates with a spatial distribution of contact pressure at interfaces between the occupant or user 20, a given seat such as the seat 12 and a given activity that the user 20 is engaged in while sitting in the seat 12 such as a driving activity. According to several aspects, to identify contact pressure the seat base 16 of the present disclosure includes at least one seat base first pressure sensor 48 which generates a first pressure signal 50 when the user 20 is positioned on the seat base 16 which is used in part to generate a seat comfort preference profile. The seat back 18 of the present disclosure also includes at least one second pressure sensor 52 which generates a second pressure signal 54 when the user 20 contacts the seat back 18 also used to generate the seat comfort preference profile.

According to several aspects, the at least one seat base first pressure sensor 48 defines multiple first pressure sensors which are configured in an array in the seat base 16 collectively generating the first pressure signal 50. According to several aspects, the at least one seat back second pressure sensor 52 defines multiple second pressure sensors which are configured in an array in the seat back 18 collectively generating the second pressure signal 54. The customer-centric portable seat comfort preference profile system 10 may also provide a module 56 identifying system operation options which may save the first pressure signal 50 and the second pressure signal 54 at the time the user 20 decides that the seat configuration setting is comfortable. The first pressure signal 50 from the at least one seat base first pressure sensor 48 and the second pressure signal 54 from the at least one seat back second pressure sensor 52 are analyzed as will be discussed in reference to FIGS. 2 and 3 to generate the seat comfort preference profiles based on the user generated pressure profiles.

The user 20 may also releasably fix the positions of the seat base 16 and the seat back 18 to repeat the selected seat positions during subsequent uses of the first vehicle 14 by actuating one of multiple position switches 58 located on a seat position selection unit 60 as a starting point of a seat position. The releasably fixed positions of the seat may then be further modified by individual ones the seat comfort preference profiles as they are established. The seat position selection unit 60 may be located at any position which is accessible to the user 20. In addition to or in lieu of using the seat position selection unit 60, the user 20 may repeatedly engage the seat positions using a key fob 62 provided with the first vehicle 14, or repeatedly engage the seat positions using a personal device 64 such as a smart phone, by indicating seat comfort level selections on a user interface 66 of the personal device 64.

First seat pressure distribution profiles of the user 20 when seated on the seat base 16 and seat back 18 are relayed to a data reduction model discussed in greater detail in reference to FIGS. 4 and 5 that converts the first seat pressure distribution profiles into compact representations using data reduction models also discussed below. The compact representations are mapped back to the first seat pressure distribution profiles and used to create individual seat comfort preference profiles.

Referring to FIG. 2 and again to FIG. 1, the first seat pressure distribution profile corresponding to when the user 20 adjusts the seat 12 in the first vehicle 14 to a position comfortable for the user 20 is a user-centric measure of a comfortable seat configuration setting for user 20 and for the particular user activity such as driving. When the user 20 moves to a different vehicle such as a second vehicle 78 with a different seat having different seat position settings and different seat features, adjusting a different seat configuration such that a second seat pressure distribution profile similar to the first seat pressure distribution profile is achieved will result in a more comfortable experience for the user 20 performing the same activity such as driving in the second vehicle 78 than if the seat configuration settings, for example a seat base angle or a seat back recline angle from the first vehicle 14 were directly duplicated in the second vehicle 78.

According to several aspects, pressure signal data may be recalled to develop seat comfort preferences for the first vehicle 14 as well as for other vehicles such as for example a second seat of a second vehicle 78. The customer-centric portable personal seat position system 10 provides for the saved seat comfort preferences of the first vehicle 14 to be transferred from the first vehicle 14 to the second vehicle 78 or any other vehicle adapted for operation of the customer-centric portable personal seat position system 10.

To adapt the selected and saved seat comfort preferences of the first vehicle 14 for transfer, a signal combiner 68 receives the first pressure signal 50 from the first pressure sensor 48 and the second pressure signal 54 from the second pressure sensor 52 and generates an output signal 70. The output signal 70 is forwarded to a signal analyzer 72, which generates seat pressure profiles from the first pressure sensor 48 pressure data and the second pressure sensor 52 second pressure signal 54. The seat pressure profiles are forwarded to a converter 74 which performs signal encoding to generate a finite set of descriptors or scalors which are derived from the seat pressure profiles and are described in greater detail in reference to FIGS. 3 and 4. The compacted finite set of descriptors or scalors from the converter 74 are stored as a user comfort profile 76. The converter 74 receives the seat pressure profiles and performs signal encoding using a trained data reduction model to generate the seat comfort preference profile, for example $D_{OA}$.

According to several aspects, to transfer the user comfort profile 76 to the second vehicle 78 the user comfort profile 76 may be forwarded to a multiplexer 80 which permits multiple output formats for sending the user comfort profile

76. The personal device 64 of the user 20 may be used to transfer the user comfort profile 76. The user comfort profile 76 may also be wirelessly uploaded to an information technology cloud infrastructure retention system 82 for subsequent transfer for example by vehicle sales or maintenance personnel of the second vehicle 78 at any time. A key fob 84 of the second vehicle 78 may also be programmed to receive the user comfort profile 76. In addition, an infotainment system 86 of the second vehicle 78 may be programmed to receive the user comfort profile 76.

Figure 2:
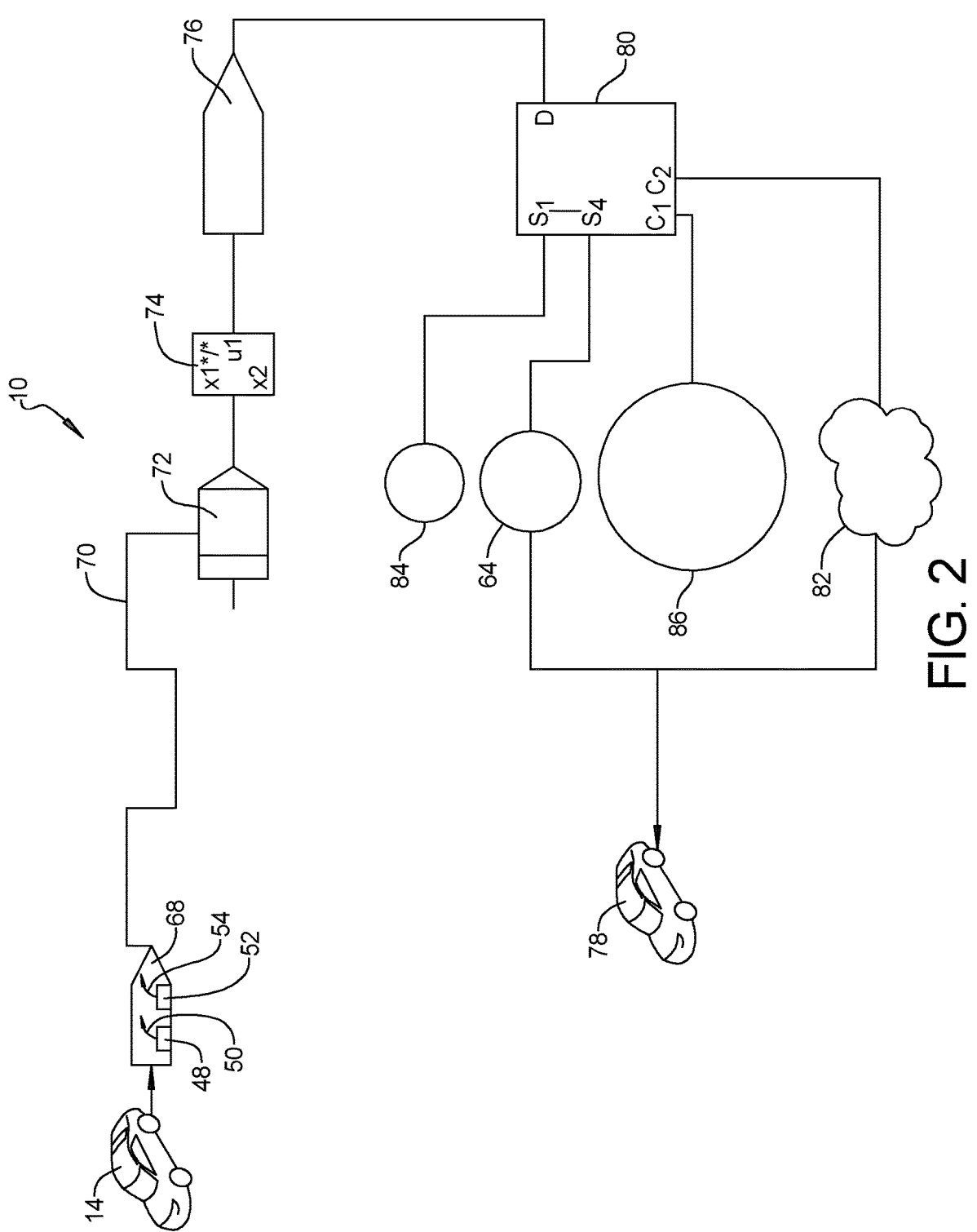
FIG. 2 is a system flow diagram providing signal processing and communication components to transfer information from the first vehicle of FIG. 1 to a second vehicle.

Referring to FIG. 3 and again to FIGS. 1 and 2, seat pressure profiles for the seat base 16 and the seat back 18 are used to understand and troubleshoot comfort issues with vehicle seats. According to several aspects, first pressure profiles between the seat 12 and the user 20 are recorded such as a first pressure profile 88 of the seat base 16. In addition, second pressure profiles between the seat back 18 and the user 20 are recorded such as a second pressure profile 90 of the seat back 18. The first pressure profile 88 and the second pressure profile 90 are forwarded to a data reduction unit 92 which may include a first data reduction unit portion 94 and a second data reduction unit portion 96 which may individually take the form of a principal component analyzer (PCA), a variational autoencoder (VAE), a generator such as from a generative adversarial network (GAN), a transformer and the like. The data reduction unit 92 encodes a compact and robust representation or shape of the seat pressure profiles as a finite set of scalars 98 ranging from a first item 100 to a final item 102 which are derived from the pressure profiles. User comfort pressure profiles for the user 20 are generated from the pressure profiles and the set of scalars 98 and saved in a database.

The features of the seat pressure distribution profiles that are pertinent to a determination of comfort for the user 20 may be encoded in a data set 104 smaller than a complete pressure map for the seat base 16 and the seat back 18. Thereafter, it is sufficient to adjust the seat configuration settings in the second vehicle 78 to achieve the data set 104 to ensure a comfortable seat for the user 20. In the following discussion, $D_{OA}$ defines a seat comfort preference profile for the user 20 during a first activity such as a driving activity. Multiple approaches to encode the salient features of the seat pressure distribution profile in the more compact representation ($D_{OA}$) are possible. Examples of suitable approaches from the statistics and machine learning fields include principal component analysis, (variational) auto-encoders, the generator part of generative adversarial networks, transformers and the like. According to a further aspect, the use of expert knowledge is applied to guide the creation of comfort preference profiles from the body pressure distributions. For example longitudinal and transverse pressure profiles are created using descriptors for pressure maps of the seat base 16 and pressure maps of the seat back 18 which represent shapes of the longitudinal and transverse pressure profiles, whereby a comfort preference profile includes a finite set of descriptors obtained in this manner.

In addition to the above identified profile $D_{OA}$ defining the seat comfort preference profile for the user 20 during the first activity such as the driving activity, multiple additional seat comfort preference profiles of the user 20 seated on the vehicle seat 12 may be generated from the multiple pressure sensor signals. For example, one profile corresponds to a comfortable seat configuration for short term driving ($D_{OA-S}$). Another profile is suitable for long duration driving ($D_{OA-L}$). A further profile is suitable for intermediate driving durations ($D_{OA-I}$). A profile for relaxing in the front passenger seat ($D_{OR-FP}$) may also be provided. Multiple similar or the same seat comfort preference profiles may be recorded when initiating vehicle operation and recalled for later use.

Figure 3:
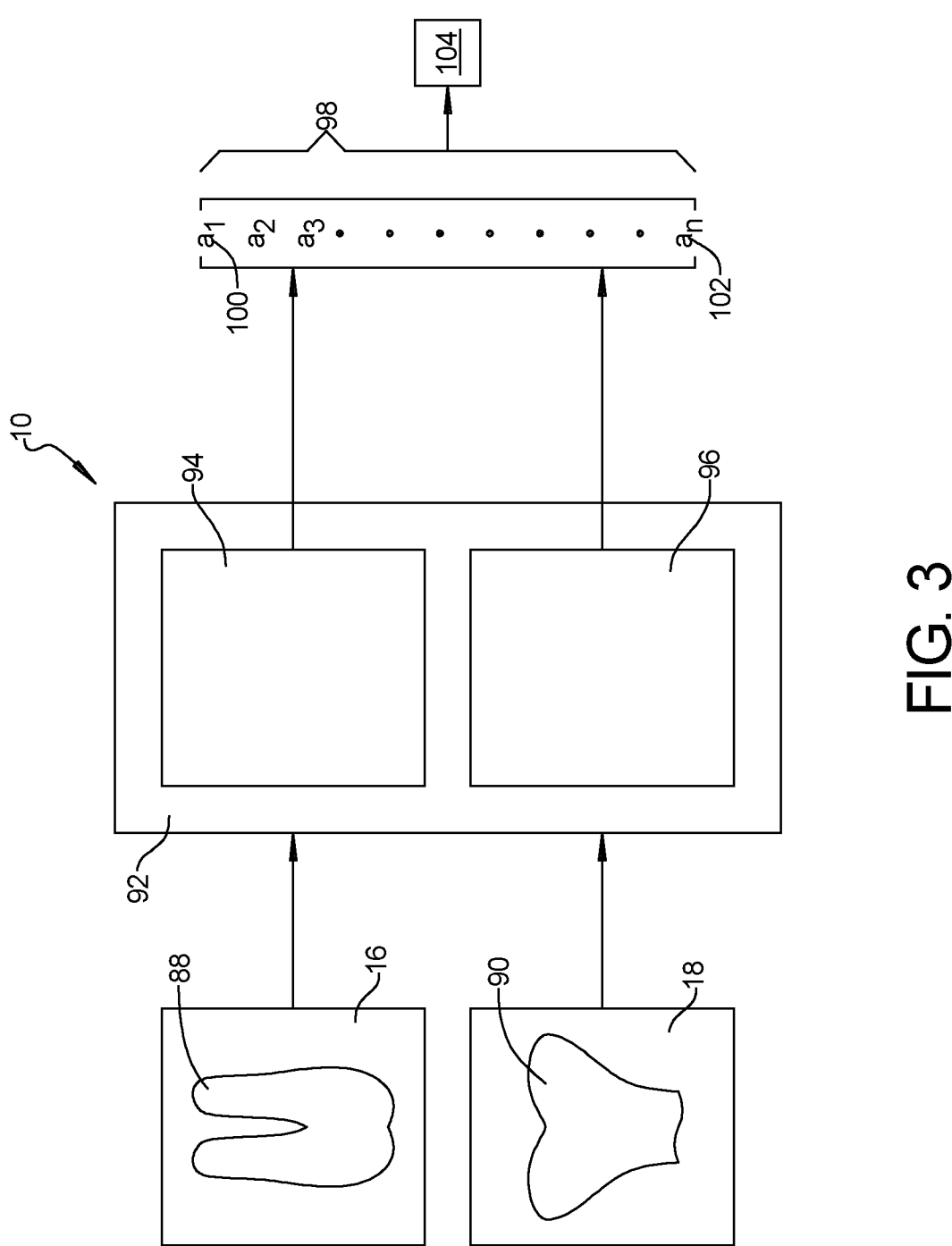
FIG. 3 is a flow diagram of the transfer of seat pressure profile data into a data reduction unit and generation of FIG. 4 is a flow diagram to encode a finite set of a Fourier shape descriptors using pressure profiles generated by the vehicle seat of FIG. 1.

Referring to FIG. 4 and again to FIGS. 1 through 3, as previously noted pressure profiles for the seat base 16 and the seat back 18 are used to understand and troubleshoot comfort issues with vehicle seats. According to several aspects, pressure profiles between seat 12 and user 20 are recorded such as a pressure profile 104 of the seat base 16. In one data reduction operation the pressure profiles defining 2-dimensional (2D) profiles are converted to one-dimensional (1D) curves of both the seat 12 and known seat bases and seat backs, for example a transverse pressure profile 106 shown in a first graph 108 presents a first 1D curve 110 having a peak pressure 112. A longitudinal pressure profile 114 is shown in a second graph 116 presenting a second 1D curve 118 having a first peak pressure 120 representing a user right leg and a second peak pressure 122 representing a user left leg.

Figure 4:
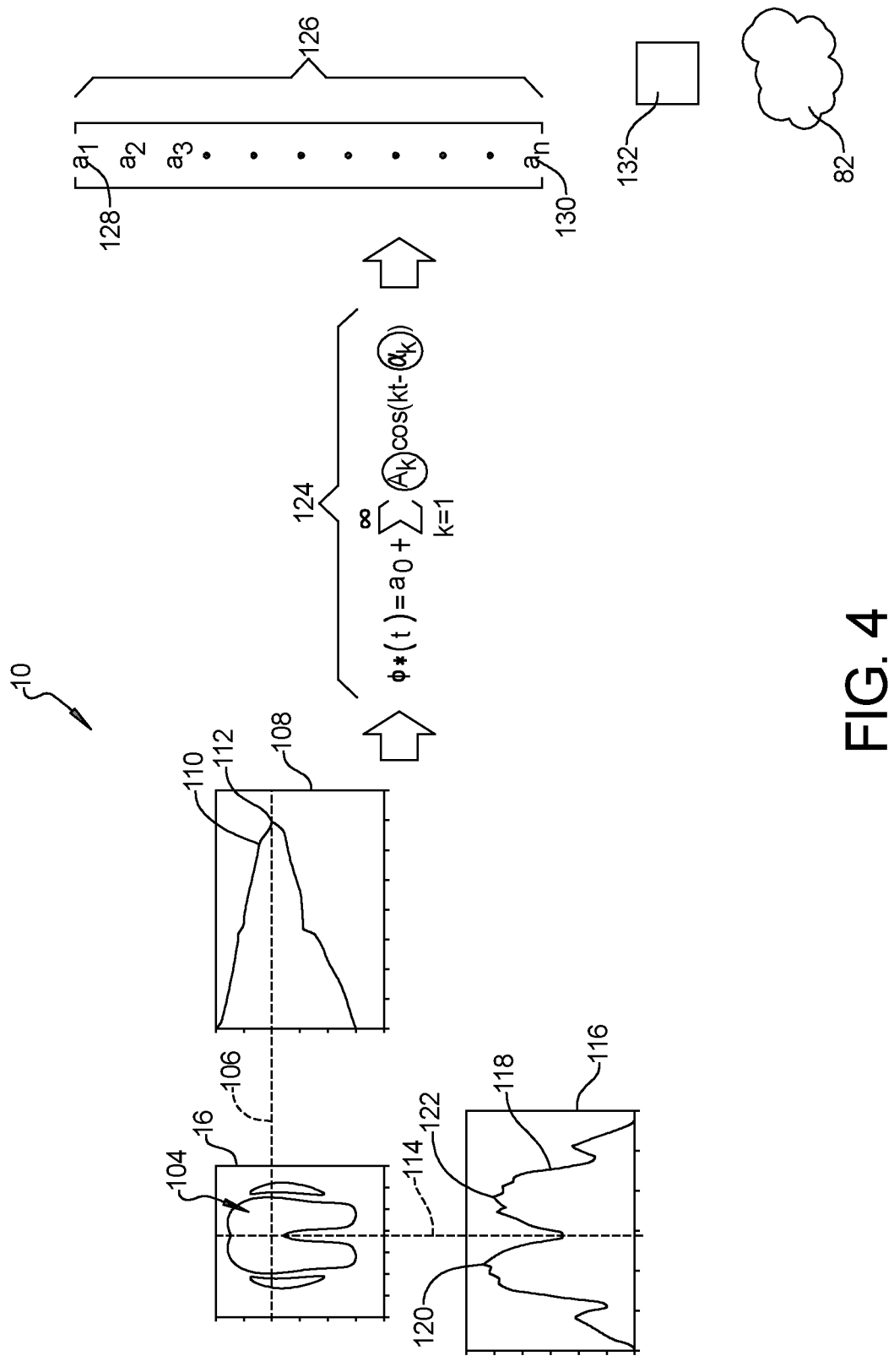
Figure 5:
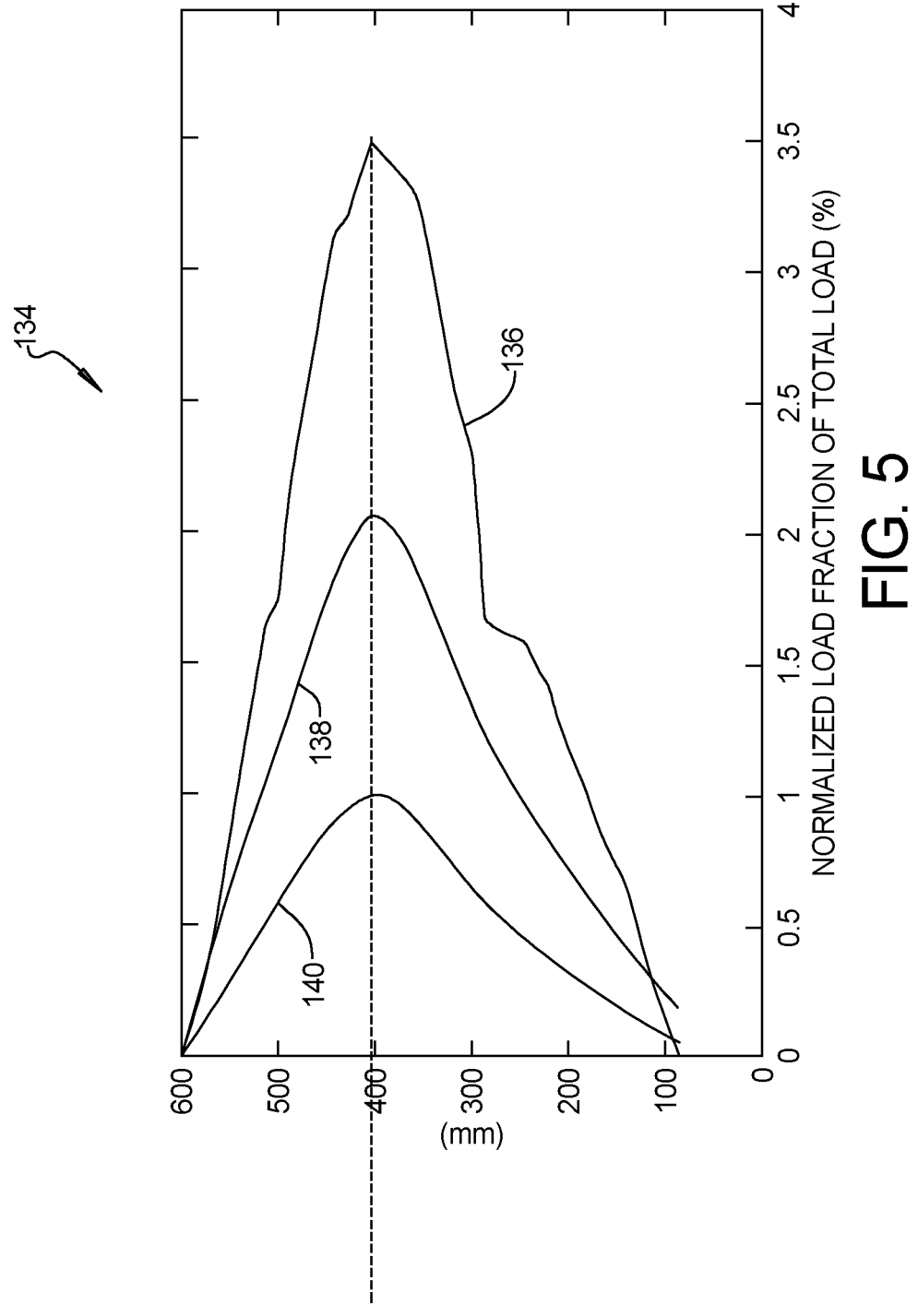
FIG. 5 is a graph presenting multiple seat pressure profiles.

With continuing reference to FIG. 4, according to several aspects, from the 1D curves a set of Fourier Shape Descriptors (FSDs) may be created using an equation 124 for example, which encode a compact and robust representation or shape of the pressure profiles. The individualized user comfort profiles for user 20 are encoded compactly in a finite data set 126 of FSDs ranging from a first item 128 to a final item 130 which are derived from the pressure profiles. The finite data set 126 may be determined once on any vehicle and stored in a customer profile database 132, which may be located in the first vehicle 14 or in the information technology cloud infrastructure retention system 82. The recorded pressure profiles of user 20 are compared to known comfortable seat positions and pressure profiles saved in the database 132. The database 132 defining a customer profile may then be recalled and used to guide the adjustment of seat 12 in the first vehicle 14 or recalled and applied to guide an adjustment of one or more seats of any vehicle including the second vehicle 78 described in reference to FIG. 2. The adjustment may be performed by the user 20 or by a technician at a dealership. Either the finite set 126 of FSDs or the reconstructed pressure profiles of the database 132 may also be shared with others.

Referring to FIG. 5 and again to FIGS. 1 through 4, according to several aspects, individualized seat comfort preference profiles for the user 20 may vary over time, including when the user 20 operates the first vehicle 14 over a first distance trip profile 136 for example having a trip time of one hour or less such as when driving to work wherein a highest seat pressure during a short duration operation may be preferred. In a second scenario seat comfort preference profiles for the user 20 may vary over time such as when the user 20 operates the first vehicle 14 over a second distance trip profile 138 for example having a trip time ranging from approximately one hour up to approximately 3 hours such as during weekend travel to visit a relative. In the second scenario a medium seat pressure profile for a medium duration operation lower than the highest seat pressure may be preferred. In a third scenario seat comfort preference profiles for the user 20 may vary over time such as over a third distance trip profile 140 for example having a trip time greater than approximately 3 hours including when the user 20 operates the first vehicle 14 on an extended trip. In the third scenario a lowest seat pressure for a long duration operation lower than the medium seat pressure may be preferred.

To accommodate varying seat comfort preference profiles the finite set 126 may be modified to include different comfort profiles for a short duration operation user comfort and up to a long duration operation. For example, the user 20 may prefer a firm seat support for short duration user comfort but modify the user comfort profile to provide a softer seat support, softer than the firm seat support, over the long duration user comfort. The user 20 may manually elect to change the user comfort profile during a driving operation, or the customer-centric portable personal seat position system 10 may make automatic changes in the user comfort profile during the driving operation. In addition, to identify user comfort profiles between the short-term and the long-term profile values, the customer-centric portable personal seat position system 10 may also conduct dynamic interpolation between the short-term and the long-term profile values.

Referring generally to FIGS. 1 through 5 the graphical user interface such as the user interface 66 of the personal device 64 shown and described in reference to FIG. 1 may be used to visualize, record, manipulate and transfer the user comfort profiles such as by a smart phone. Other user interfaces available on key-fobs, tablets, webpages, at off-site or vehicle sales sites, personal computers and the like may also be used. The customer-centric portable personal seat position system 10 allows the user 20 to save and transfer user comfort profiles from the first vehicle 14 to the second vehicle 78.

According to several aspects, the customer-centric portable seat comfort preference profile system 10 of the present disclosure provides a method to operate a customer-centric portable personal vehicle seat position system. The method includes generating seat pressure sensor profiles from arrays of pressure sensors positioned in a seat base and separately in a seat back of a vehicle seat in response to a user being seated on the vehicle seat of a vehicle. The pressure sensor profiles are correlated to individual user tasks such as driving, reading, resting and operating the vehicle over predetermined time periods causing seat comfort changes for the user. Data collected during vehicle operation is reduced in a data reduction unit to a finite set of scalars to permit determination of seat comfort preference profiles encoding multiple seat pressure profiles from which the user may select or change a seating comfort.

A customer-centric portable personal seat position system 10 of the present disclosure offers several advantages. These include the individualized seat comfort preferences for a user can be encoded compactly in a finite set of scalars derived from seat pressure profiles. The set may be determined once on any vehicle and stored in a customer's profile. The set may also be recalled and used to guide the adjustment of a seat in a different vehicle. The adjustment may be performed by the customer or by a technician at a dealership. The set of scalars or the reconstructed pressure profiles may be shared with others allowing a seat comfort profile of the user to be transferred to another vehicle.

What is claimed is:
1. A method to operate a customer-centric portable personal vehicle seat position system, comprising:
    positioning, within a first vehicle, a first array of pressure sensors in a seat base of a first vehicle seat and a second array of pressure sensors in a seat back of the first vehicle seat;
    measuring first pressure distributions of a user in contact with the first vehicle seat using the first array of pressure sensors and the second array of pressure sensors;
    computing pressure profiles for a seat cushion and a seat back of the first vehicle seat;

correlating the pressure sensor profiles to individual user tasks;

performing data reduction of the pressure sensor profiles after correlation to the individual user tasks by creating a compact representation of the pressure profiles having a finite set of Fourier Shape Descriptors (FSDs) in a reduction model;

encoding multiple seat comfort preference profiles by encoding the finite set as the comfort preference profile of the user for a first vehicle and storing the comfort preference profile in a user profile database;

recalling the user profile database;

forwarding the user profile database to a second vehicle; and adjusting a second vehicle seat of the second vehicle based on the user profile database.

2. The method of claim 1, including:

positioning a first set of pressure sensors in the first array of pressure sensors in the seat base generating a first set of the pressure sensor profiles; and locating a second set of pressure sensors in the second array of pressure sensors in the seat back generating a second set of the pressure sensor profiles.

3. The method of claim 2, including:

receiving and saving the first set of the pressure sensor profiles, the second set of the pressure sensor profiles and the multiple seat comfort preferences in a module; and forwarding the multiple seat comfort preferences from the module to the user upon request from the user during a second or later vehicle operation.

4. The method of claim 2, including:

generating an output signal using a signal combiner combing the first set of the pressure sensor profiles from the first pressure sensor and the second set of the pressure sensor profiles from the second pressure sensor and;

forwarding the output signal to a signal analyzer;

generating seat pressure profiles from the first set of the pressure sensor profiles and from the second set of the pressure sensor profiles; and performing signal encoding using the seat pressure profiles to generate a set of scalars.

5. The method of claim 1, including:

storing the multiple seat comfort preferences in a customer profile database;

recalling the multiple seat comfort preferences from the customer profile database; and adjusting a second vehicle seat of a second vehicle applying one of the multiple seat comfort preferences.

6. The method of claim 5, including:

encoding the multiple seat comfort preference profiles for one of a short duration driving event and for a long duration driving event; and selectively requesting one of the multiple seat comfort preference profiles for the short duration driving event or for the long duration driving event.

7. The method of claim 1, including encoding the multiple seat comfort preference profiles as a first set of driving tasks when the user defines a vehicle operator and as a second set of non-driving tasks when the user defines a vehicle passenger.

8. The method of claim 1, including operating a user interface to allow the user to at least one of visualize, record and manipulate the multiple seat comfort preference profiles.

9. A method to generate and use a customer-centric portable personal vehicle seat comfort preference profile, comprising:

positioning, within a first vehicle, a first array of pressure sensors in a seat base of a first vehicle seat and a second array of pressure sensors in a seat back of the first vehicle seat;

measuring first pressure distributions of a user in contact with the first vehicle seat using the first array of pressure sensors and the second array of pressure sensors;

computing pressure profiles for a seat cushion and a seat back of the first vehicle seat;

creating a compact representation of the pressure profiles having a finite set of Fourier Shape Descriptors (FSDs) in a reduction model;

encoding the finite set as a comfort preference profile of the user for a first vehicle and storing the comfort preference profile in a user profile database located in one of the first vehicle or in a cloud retention system, recalling the user profile database;

forwarding the user profile database to a second vehicle; and adjusting a second vehicle seat of the second vehicle based on the user profile database.

10. The method of claim 9, further including:

informing changing a configuration of the first vehicle seat during a drive to compare a modified pressure distribution to stored values encoded in the comfort preference profile; and switching the configuration of the first vehicle seat as a duration of the drive changes between a short duration operation, a medium duration operation and a long duration operation.

11. The method of claim 10, further including informing automatic changes in the comfort preference profile of the user during the short duration operation, the medium duration operation and the long duration operation.

12. The method of claim 9, further including automatically conducting dynamic interpolation between values of the comfort preference profile.

13. The method of claim 9, further including:

measuring second pressure distributions for the user sitting in a second vehicle seat of a second vehicle;

applying the reduction model to generate a compact representation of the second pressure distributions; and comparing the first pressure distributions to the second pressure distributions and applying differences between the first pressure distributions and the second pressure distributions to guide adjustment of the second vehicle seat.

14. The method of claim 9, further including loading a customer profile having multiple different ones of the comfort preference profile of the user into a user interface to visualize, record and manipulate the customer profile.

15. The method of claim 14, further including selecting the user interface from one of a smart phone, a tablet, a webpage, a key-fob and a computer.

* * * * *